(12) United States Patent
Suzuki

(10) Patent No.: US 8,670,013 B2
(45) Date of Patent: Mar. 11, 2014

(54) LIGHT SCANNING DEVICE, LIGHT SCANNING DEVICE PRODUCTION METHOD, AND COLOR IMAGE FORMING APPARATUS

(75) Inventor: Mitsuo Suzuki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1294 days.

(21) Appl. No.: 11/850,568

(22) Filed: Sep. 5, 2007

(65) Prior Publication Data

US 2008/0088889 A1 Apr. 17, 2008

(30) Foreign Application Priority Data

Sep. 6, 2006 (JP) .................. 2006-242006

(51) Int. Cl.
  B41J 2/435 (2006.01)
  B41J 2/47 (2006.01)
(52) U.S. Cl.
  USPC ........................... 347/234; 347/248; 347/229
(58) Field of Classification Search
  USPC ......... 347/229, 234, 235, 241, 243, 248, 249, 347/256, 258–260
  See application file for complete search history.

(56) References Cited

U.S. PATENT DOCUMENTS

| | | | |
|---|---|---|---|
| 4,726,640 A | 2/1988 | Iwama et al. | |
| 5,069,515 A | 12/1991 | Itami et al. | |
| 5,245,181 A * | 9/1993 | Cho | 250/236 |
| 5,726,699 A | 3/1998 | Itami et al. | |
| 5,739,602 A | 4/1998 | Suzuki et al. | |
| 5,769,544 A | 6/1998 | Suzuki et al. | |
| 5,856,669 A * | 1/1999 | Nagasaka et al. | 250/235 |
| 6,115,012 A * | 9/2000 | Eguchi et al. | 345/84 |
| 6,226,029 B1 * | 5/2001 | Lannom | 347/248 |
| 6,236,040 B1 * | 5/2001 | Takemura et al. | 250/235 |
| 6,580,186 B1 | 6/2003 | Suzuki et al. | |
| 6,778,203 B2 | 8/2004 | Itami et al. | |
| 6,822,775 B2 | 11/2004 | Suzuki et al. | |
| 7,045,773 B2 | 5/2006 | Suzuki et al. | |
| 7,050,082 B2 | 5/2006 | Suzuki et al. | |
| 7,145,589 B2 * | 12/2006 | Amada et al. | 347/241 |
| 7,167,288 B2 | 1/2007 | Miyatake et al. | |
| 7,532,227 B2 * | 5/2009 | Nakajima et al. | 347/241 |
| 7,589,756 B2 * | 9/2009 | Matsumae et al. | 347/241 |
| 7,593,028 B2 * | 9/2009 | Kimura | 347/234 |
| 7,697,184 B2 * | 4/2010 | Sakaue et al. | 359/212.1 |
| 2005/0179971 A1 | 8/2005 | Amada et al. | |
| 2007/0236557 A1 | 10/2007 | Imai et al. | |

FOREIGN PATENT DOCUMENTS

| | | | | |
|---|---|---|---|---|
| JP | 63-043172 | 2/1988 | | |
| JP | H07-019084 B | 1/1995 | | |
| JP | 2004-109700 | 4/2004 | | |
| JP | 2006-035623 | 2/2006 | | |
| JP | 2006035623 A * | 2/2006 | ................ | B41J 2/44 |

* cited by examiner

Primary Examiner — Hai C Pham
(74) Attorney, Agent, or Firm — Dickstein Shapiro LLP

(57) ABSTRACT

A light scanning device includes a semiconductor laser which emits a laser beam in response to an image forming signal, an optical deflector which scans the laser beam emitted from the semiconductor laser in a main scanning direction, and a liquid crystal deflecting element which changes the scanning position of the laser beam emitted from the semiconductor laser while desynchronized with output of the image forming signal, thereby to correct the scanning position of the laser beam in a sub-scanning direction.

10 Claims, 12 Drawing Sheets

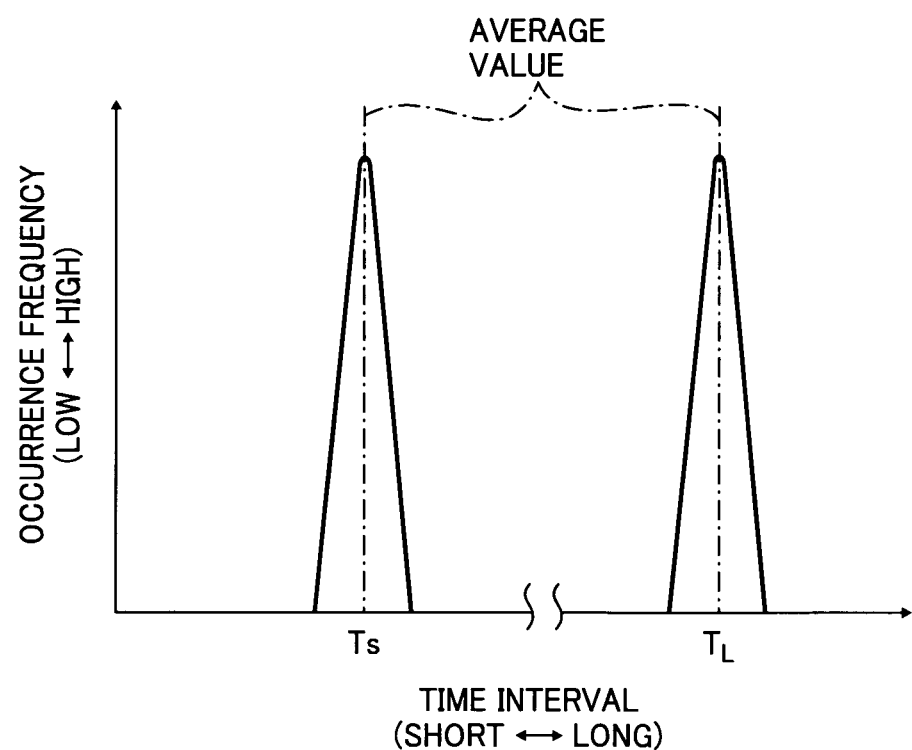

LIGHT SCANNING DEVICE, LIGHT SCANNING DEVICE PRODUCTION METHOD, AND COLOR IMAGE FORMING APPARATUS

CROSS-REFERENCE TO THE RELATED APPLICATION

The present application claims the priority benefit of Japanese Patent Application No. 2006-242006, filed on Sep. 6, 2006. The content of the above-identified application is incorporated herein by reference.

BACKGROUND OF THE INVENTION

1. Field of the Invention

The present invention relates to a light scanning device which performs light scanning, a production method therefor, and an image forming apparatus such as a copying machine, a printer, a facsimile, and a plotter in which the light scanning device is incorporated.

2. Description of the Related Art

For example, Japanese Patent Application Publication (JP-B) No. 7-19084 (Patent Document 1) discloses a tandem-type image recording apparatus in which plural recording devices are arranged, and images are superposed and transferred while a transfer paper is sequentially conveyed to the recording devices by a transfer belt. Each of the recording devices includes: a laser beam exposure unit which converts image light obtained by color separation of recording information into a digital signal and projects the digital signal onto a photosensitive member; a development unit which develops an electrostatic latent image on the photosensitive member; and a transfer unit which transfers a visualized image on the photosensitive member to transfer paper. In the tandem-type image recording apparatus, a measuring pattern image is formed on a conveyance belt in each color to detect passage of each color pattern image, a difference between detection timing and a setting value is computed from a detection signal for each color, and write start timing is adjusted to realize a decrease in shift between colors and improvement of image quality by a write start timing signal which is arbitrarily changeable in response to the value from the computing unit.

For example, Japanese Patent Application Laid-Open (JP-A) No. 2006-35623 (Patent Document 2) discloses a light scanning device including: a color shift detection unit which detects position shift between visualized images corresponding to colors; a laser beam detector which detects a scanning position of a laser beam; and a scanning position changing unit which changes the scanning position of the laser beam in a sub-scanning direction. The laser beam detector outputs a change signal for changing the scanning position of the laser beam to the scanning position changing unit according to the detected color shift amount, and detects again the scanning position of the laser beam corresponding to each color before image formation. The scanning position changing unit changes the scanning position again without performing the image forming process when the detection result performed again by the laser beam detector is not lower than a setting value.

The light scanning device is characterized in that a time necessary for the change performed by the scanning position changing unit is shorter than a non-image formation time between pages during continuous print.

However, in the technique disclosed in Patent Document 1, even if the color shift is generated by temperature rise with time during use of the image forming apparatus, the image deterioration with time cannot be prevented because the image forming apparatus has no color shift correction unit.

In the technique disclosed in Patent Document 2, it is necessary to extremely shorten the time for changing the scanning position of the laser beam, and it is also necessary that a driving unit for rotating an optical element which is of the changing unit be driven at high speed. Therefore, there are problems such as an increase in power consumption, deformation of the optical element caused by the temperature rise, a decrease in image quality caused by deterioration of a rotating mechanism unit, and inhibition of stabilization of image quality.

Some of color image forming apparatus such as a color laser printer include plural scanning imaging optical systems. In the color image forming apparatus, the plural light scanning units perform the laser beam scanning to independently write information on plural different colors onto plural photosensitive members rotated by a driving mechanism, whereby plural electrostatic latent images are formed. Then, the plural electrostatic latent images are visualized in plural visualizing units, and the visualized images are superposed on a transfer material to form a color image.

Specifically, in each of the light scanning units, a semiconductor laser driven according to an image information signal of each color emits the laser beam. The laser beam is collected onto a surface of a uniformly-charged photosensitive member through optical components such as a polygon mirror and a lens, and is scanned in a main scanning direction.

The electrostatic latent image is formed by writing an image signal into the rotating photosensitive member surface according to the plural scanning beams having predetermined intervals.

In the color image forming apparatus, a time from the latent image formation to the transfer and a distance between photosensitive members are different depending on eccentricity of the photosensitive member and a variation in diameter. In addition, a registration position shift of each toner image in the sub-scanning direction is generated by a fluctuation in speed and meandering of the transfer body, the transfer belt, or a conveyance belt for conveying recording paper, which generates the color shift to deteriorate the image quality.

Additionally, in the light scanning device, unless the write start timing of an electrostatic latent image formed in the photosensitive member is correctly adjusted in each color, the color shift is generated due to the registration position shift.

Conventionally, the registration position shift is periodically detected during start-up of the apparatus or between jobs by a registration position shift detection pattern recorded in the transfer body, and the registration position is corrected in the sub-scanning direction by measuring the write start timing every two polygon mirror surfaces.

When the laser beam traveling toward the photosensitive member is set to pass through different optical paths because of restriction of component arrangement, the scanning position fluctuates easily by ambient temperature at which the color image forming apparatus is installed. The scanning position shift is periodically detected and corrected during start-up of the apparatus or between jobs by the registration position shift detection pattern recorded in the transfer body. However, in this case, the scanning position further fluctuates by heat generation of a fixing device and a polygon mirror motor associated with a continuous printing operation. Therefore, when the number of prints is increased in one job, there is also generated a problem in that the color shift is gradually increased.

SUMMARY OF THE INVENTION

In view of the foregoing, an object of the invention is to provide a light scanning device which enables a scanning position of a laser beam to be corrected in a sub-scanning direction and allows suppression of a color shift and a color change during job thereby to realize high-quality image and stabilization of image quality, and a color image forming apparatus provided with the light scanning device.

A first aspect according to the invention provides a light scanning device including a light source which emits a laser beam in response to an image forming signal; a deflection scanning unit which scans the laser beam emitted from the light source in a main scanning direction; and a scanning position correction unit which changes a scanning position of the laser beam emitted from the light source while desynchronized with output of the image forming signal, thereby to correct the scanning position of the laser beam in a sub-scanning direction.

A second aspect according to the invention provides a light scanning device including a light source which emits a laser beam in response to an image forming signal; a deflection scanning unit which scans the laser beam emitted from the light source in a main scanning direction; and a scanning position correction unit which changes a scanning position of the laser beam emitted from the light source, thereby to correct the scanning position of the laser beam in a sub-scanning direction, wherein the image forming signal is output at timing previously set in consideration of image quality in a transient state of the scanning position change performed by the scanning position correction unit.

In the light scanning device according to the first and second aspects, preferably the scanning position correction unit corrects the scanning position of the laser beam in a range of one to two times pixel density in the sub-scanning direction.

In the light scanning device according to the first and second aspects, preferably the scanning position correction unit is arranged between the light source and the deflection scanning unit so that the laser beam emitted from the light source is incident to the scanning position correction unit, the scanning position correction unit including a liquid crystal deflecting element which receives control of an applied voltage to control a deflection state of an optical axis of the incident laser beam, and the liquid crystal deflecting element controls the deflection state to correct the scanning position of the laser beam.

In the light scanning device according to the first and second aspects, preferably the scanning position correction unit is arranged between the light source and the deflection scanning unit so that the laser beam emitted from the light source is incident to the scanning position correction unit, the scanning position correction unit including a nonparallel plate which receives rotational control to control a deflection state of an optical axis of the incident laser beam, and the nonparallel plate controls the deflection state to correct the scanning position of the laser beam.

The light scanning device according to the first and second aspects preferably includes a laser beam detector having a light acceptance element pair configured in such a manner that two light acceptance elements having laser-beam passing surfaces which are provided while being not parallel to each other to allow a scanning laser beam to pass therethrough, are combined so that the laser-beam passing surfaces are parallel to each other.

In the light scanning device according to the first and second aspects, preferably the laser beam detector always performs detection irrespective of presence or absence of the output of the image forming signal, and the scanning position correction unit responds to the detection of the laser beam detector to correct the scanning position of the laser beam based on the detection result.

In the light scanning device according to the first and second aspects, preferably the light acceptance element is located in a substantial center in the sub-scanning direction.

A third aspect according to the invention provides a method for producing a light scanning device including: a light source which emits a laser beam in response to an image forming signal; a deflection scanning unit which scans the laser beam emitted from the light source in a main scanning direction; and a scanning position correction unit which changes a scanning position of the laser beam emitted from the light source while desynchronized with output of the image forming signal, thereby to correct the scanning position of the laser beam in a sub-scanning direction, wherein a position of the light acceptance element is set by moving and adjusting the light acceptance element in the sub-scanning direction so that an output signal of a laser beam detector exists in a predetermined range according to the position of the light acceptance element.

A fourth aspect according to the invention provides a method for producing a light scanning device including: a light source which emits a laser beam in response to an image forming signal; a deflection scanning unit which scans the laser beam emitted from the light source in a main scanning direction; and a scanning position correction unit which changes a scanning position of the laser beam emitted from the light source while desynchronized with output of the image forming signal, thereby to correct the scanning position of the laser beam in a sub-scanning direction, the image forming signal being output at timing previously set in consideration of image quality in a transient state of the scanning position change performed by the scanning position correction unit, wherein a position of the light acceptance element is set by moving and adjusting the light acceptance element in the sub-scanning direction so that an output signal of a laser beam detector exists in a predetermined range according to the position of the light acceptance element.

A fifth aspect according to the invention provides a color image forming apparatus, wherein the light scanning device according to the first aspect is applied, a latent image is formed in an image bearing member, and the latent image is visualized to obtain a recording image.

A sixth aspect according to the invention provides a color image forming apparatus, wherein the light scanning device according to the second aspect is applied, a latent image is formed in an image bearing member, and the latent image is visualized to obtain a recording image.

According to the first aspect, even if the temperature in the apparatus is rapidly increased to change the scanning position during the image formation, the scanning positions can sequentially be corrected irrespective of the presence or absence of the output of the image forming signal, whereby a light scanning device is realized which can stably maintain the scanning position of the laser beam with high accuracy.

According to the second aspect, the influence of the rapid change of the scanning position associated with the operation of the scanning position correction unit can be suppressed to the minimum. That is, because the image forming signal is output during the time the operation for changing the scanning position of the laser beam is gentle, the change of the formed image is hardly visually recognized.

According to the first and second aspects, it is possible to realize the light scanning device in which the scanning position correction unit does not rapidly change the scanning position of the laser beam and the scanning position of the laser beam can be stably maintained with high accuracy.

According to the first and second aspects, because the driving unit which leads to the mechanical deterioration is eliminated, it is possible to realize the high-reliability and compact light scanning device in which the scanning position of the laser beam is stably maintained with high accuracy.

According to the first and second aspects, the light scanning device is realized at low cost, which can stably maintain the scanning position of the laser beam with high accuracy, without deteriorating a laser beam profile.

According to the first and second aspects, the compact light scanning device which accurately detects the laser beam can be realized.

According to the first and second aspects, the scanning position of the laser beam is always detected to correct the scanning position of the laser beam based on the detection result. Therefore, it is possible to realize the light scanning device which can stably maintain the scanning position of the laser beam with high accuracy even if the scanning position is rapidly changed.

According to the first and second aspects, the detection region of the sub-scanning position of the laser beam is maximized and optimized even if the scanning position is largely changed, so that the light scanning device which can stably maintain the scanning position of the laser beam with high accuracy can be realized.

According to the third and fourth aspects, the detection region of the sub-scanning position of the laser beam is maximized and optimized even if the scanning position is largely changed. Therefore, it is possible to realize the method for producing the light scanning device which can stably maintain the scanning position of the laser beam with high accuracy.

According to the third aspect, even if the temperature in the apparatus is rapidly increased to change the scanning position during the image formation, the scanning positions can sequentially be corrected irrespective of the presence or absence of the output of the image forming signal, allowing the realization of the method for producing the light scanning device in which the scanning position of the laser beam can stably be maintained with high accuracy.

According to the fourth aspect, it is possible to realize the method for producing the light scanning device in which the influence of the rapid change of the scanning position associated with the operation of the scanning position correction unit is suppressed to the minimum. That is, because the image forming signal is output during the time the operation for changing the scanning position of the laser beam is gentle, the change of the formed image is hardly visually recognized.

According to the fifth aspect of the invention, the color image forming apparatus provided with the light scanning device according to the first aspect can be realized.

According to the sixth aspect of the invention, the color image forming apparatus provided with the light scanning device according to the second aspect can be realized.

BRIEF DESCRIPTION OF THE DRAWINGS

FIG. 3A shows a state in which light deflected by an upper polygon mirror is guided to a light scanning position,
and FIG. 3B shows a state in which light deflected by a lower polygon mirror is guided to a light scanning position;
FIG. 9A is a plan view showing an arrangement state of light acceptance elements,
FIG. 9B shows a relationship between an output waveform of the light acceptance element and an output waveform of a comparator,
and FIG. 9C shows an output waveform of the comparator which is obtained from a continuously-rotating polygon mirror;
FIG. 10 is a graph showing a scanning time interval;
FIG. 11A is an exploded perspective view showing the scanning position changing unit,
and FIG. 11B is a perspective view showing an assembled scanning position changing unit.

Figure 1:
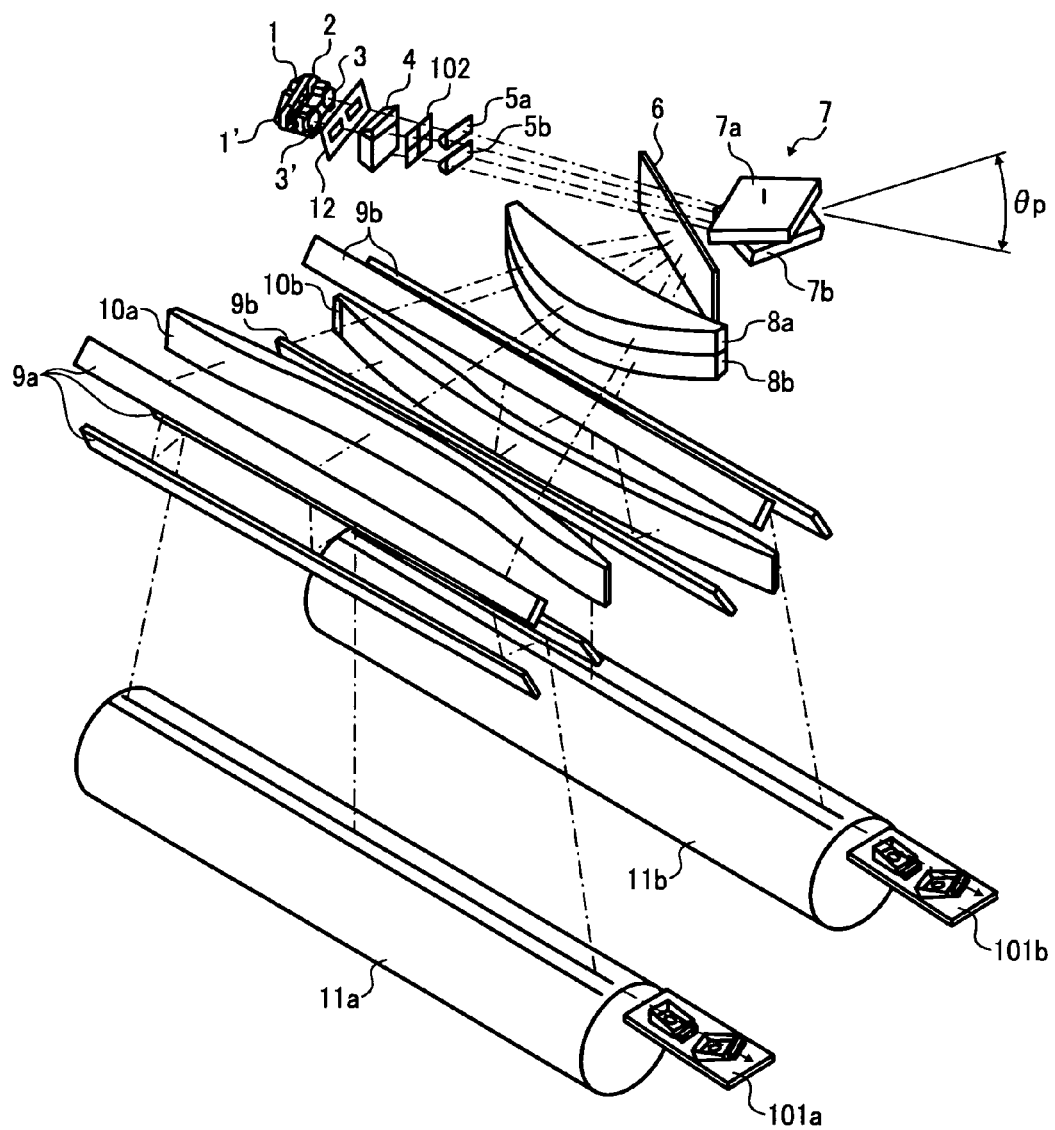
FIG. 1 is a perspective view showing a light scanning device according to a first embodiment of the invention.

EXPLANATIONS OF REFERENCE NUMERALS 1 and 1': Semiconductor laser as light source
7: Polygon mirror as deflection scanning unit
101a and 101b: Laser beam detector
102: Liquid crystal deflecting element as scanning position correction unit
PD1 and PD2 Light acceptance element

DETAILED DESCRIPTION

A first embodiment of the invention will be described below with reference to FIGS. 1 to 10. FIG. 1 shows a light scanning device according to the first embodiment. Laser beams are emitted from semiconductor lasers 1 and 1' as a light source and split in a sub-scanning direction by a half-mirror prism 4. Of the laser beams, the laser beam (laser beam L11 of FIG. 2: the two laser beams are shown in FIG. 1) transmitted straight ahead through a semi-transparent mirror 4a of the half-mirror prism 4 is incident to a cylindrical lens 5a. On the other hand, the laser beam (laser beam L12 of FIG. 2) reflected by the semi-transparent mirror 4a and reflected by a reflecting plane 4b is incident to a cylindrical lens 5b.

An optical deflector 7 includes a polygon mirror which is of a deflection scanning unit, and a sound-proof glass 6 is provided in a window of a sound-proof housing (not shown) of the optical deflector 7. The four laser beams which are emitted from the light source side, i.e., the two laser beams which are emitted from the semiconductor laser 1 and split in the sub-scanning direction by the half-mirror prism 4 and the two laser beams which are emitted from the semiconductor laser 1' and split in the sub-scanning direction by the half-mirror prism 4 are incident to the optical deflector 7 through the sound-proof glass 6, and the four deflected laser beams are output onto a scanning imaging optical system side through the sound-proof glass 6.

As shown in FIG. 1, in the optical deflector 7, an upper polygon mirror 7a and a lower polygon mirror 7b are vertically provided in the sub-scanning direction (rotational axis direction), so that the optical deflector 7 is rotated about the rotational axis by a driving motor (not shown).

Both the upper polygon mirror 7a and the lower polygon mirror 7b are formed in the shape having four deflection reflecting planes. The deflection reflecting plane of the upper polygon mirror 7a and the deflection reflecting plane of the lower polygon mirror 7b are shifted from each other by predetermined angles: $\theta p$ (=45 degrees) in the rotational direction.

The numerals 8a and 8b each designate a first scanning lens, the numerals 10a and 10b each designate a second scanning lens, and the numerals 9a and 9b each designate an optical path folding mirror. Photosensitive members 11a and 11b are of surfaces to be scanned or positions to be scanned.

The first scanning lens 8a, the second scanning lens 10a, and the optical path folding mirror 9a constitute a set of scanning imaging optical systems. The scanning imaging optical systems guide the two laser beams, deflected by the upper polygon mirror 7a of the optical deflector 7, onto the photosensitive member 11a (light scanning position) to form two light spots separated in the sub-scanning direction.

Similarly, the first scanning lens 8b, the second scanning lens 10b, and the optical path folding mirror 9b constitute a set of scanning imaging optical systems. The scanning imaging optical systems guide the two laser beams, deflected by the upper polygon mirror 7b of the optical deflector 7, onto the photosensitive member 11b (light scanning position) to form two light spots separated in the sub-scanning direction.

In the laser beams emitted from the semiconductor lasers 1 and 1', an optical arrangement is defined such that main light beams intersect each other near a position of the deflection reflecting plane when viewed from the rotational axis direction of the optical deflector 7. Accordingly, in each pair of light fluxes incident to the deflection reflecting plane, the laser beams mutually have angles of aperture (an angle formed by the laser beam and a plane orthogonal to the rotational axis when the light source side is viewed from the deflection reflecting plane side).

Thus, the two laser beams (multi-beam) deflected by the upper polygon mirror 7a of the optical deflector 7 are scanned on the surface of the photosensitive member 11a, and the two laser beams (multi-beam) deflected by the lower polygon mirror 7b of the optical deflector 7 are scanned on the surface of the photosensitive member 11b.

The deflection reflecting planes of the upper polygon mirror 7a and lower polygon mirror 7b of the optical deflector 7 are shifted from each other by 45 degrees (when the polygon mirror has four surfaces, the shift is set to 360 degrees/4/2=45 degrees) in the rotational direction. For this reason, when the photosensitive member 11a is scanned with the laser beam deflected by the upper polygon mirror 7a, the laser beam deflected by the lower polygon mirror 7b is not guided to the photosensitive member 11b. On the contrary, when the photosensitive member 11b is scanned with the laser beam deflected by the lower polygon mirror 7b, the laser beam deflected by the upper polygon mirror 7a is not guided to the photosensitive member 11a.

That is, the photosensitive members 11a and 11b are mutually scanned with a time difference.

Figure 3A:
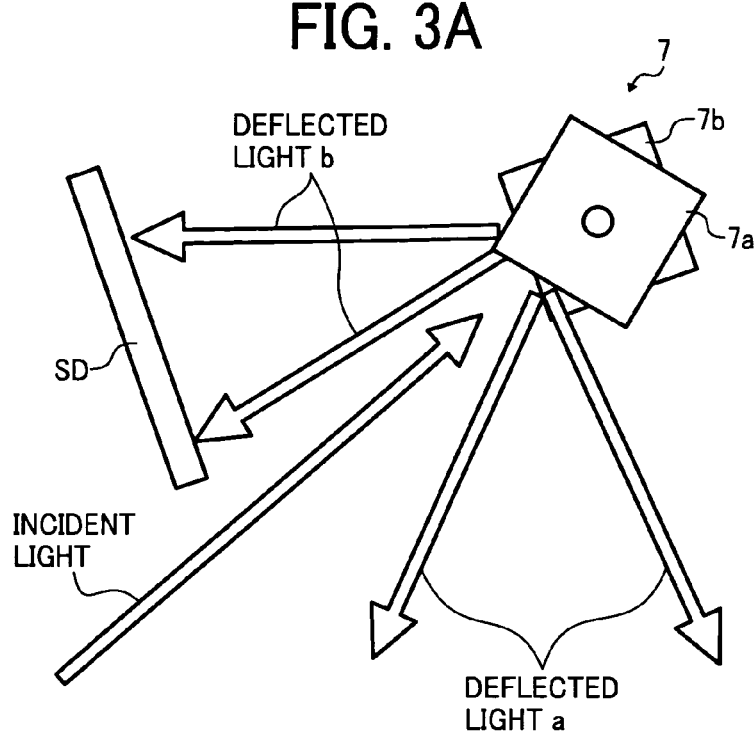
FIGS. 3A and 3B each show a deflection state performed by a deflection scanning unit, where
Figure 3B:
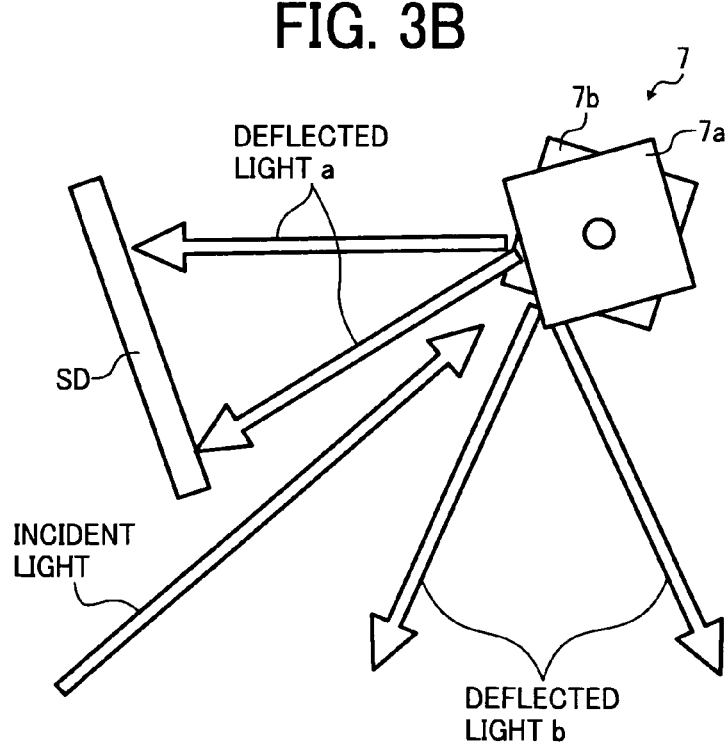

FIGS. 3A and 3B show a deflection state performed by a deflection scanning unit. For the purpose of simple explanation, in FIG. 3, the laser beam (actually four laser beams) incident to the optical deflector is shown as "incident light" and the deflected laser beams are shown as "deflected light "a" and deflected light b".

FIG. 3A shows a state, in which incident light is incident to the optical deflector 7 and is then reflected and deflected by the upper polygon mirror 7a, and the deflected light "a" is guided to a light scanning position. At this point, the deflected light b deflected by the lower polygon mirror 7b does not travel toward the light scanning position. FIG. 3B shows a state in which the deflected light b deflected by the lower polygon mirror 7b is guided to the light scanning position. At this point, the deflected light "a" deflected by the upper polygon mirror 7a does not travel toward the light scanning position.

The deflected light which is not guided to the light scanning position can be shielded using a light shielding unit SD shown in FIG. 3 such that the light deflected by one of the polygon mirrors has unintended action as ghost light in the state in which the light deflected by the other polygon mirror is guided to the light scanning position.

Figure 4:
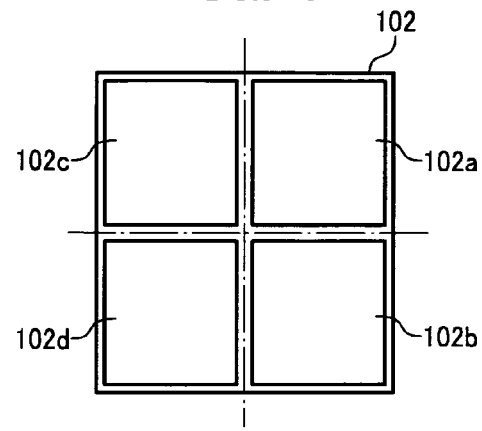
FIG. 4 shows a configuration of divided liquid crystal changing regions in a liquid crystal deflecting element as a scanning position correction unit.
Figure 5:
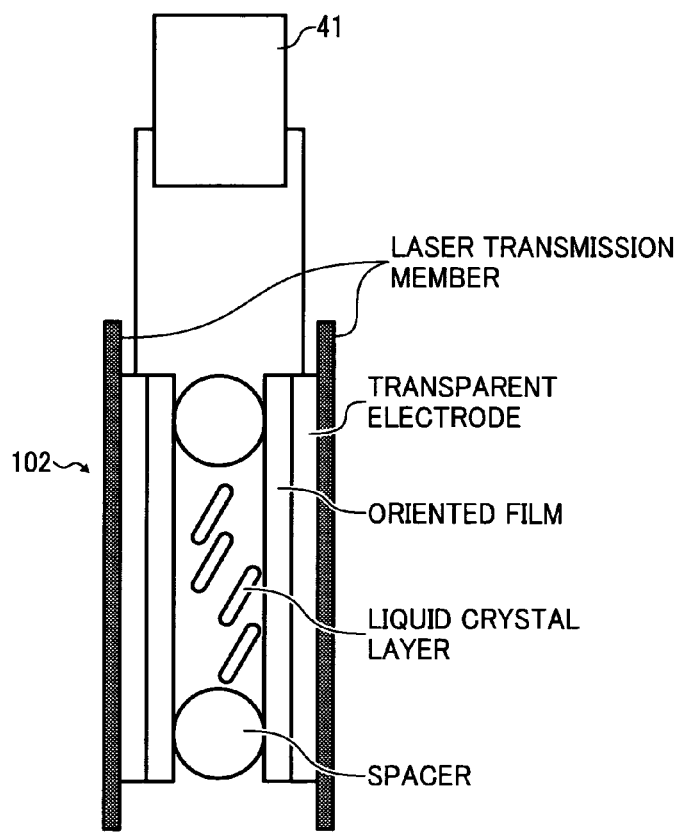
FIG. 5 is a sectional view showing the liquid crystal deflecting element along a sub-scanning direction.
Figure 6:
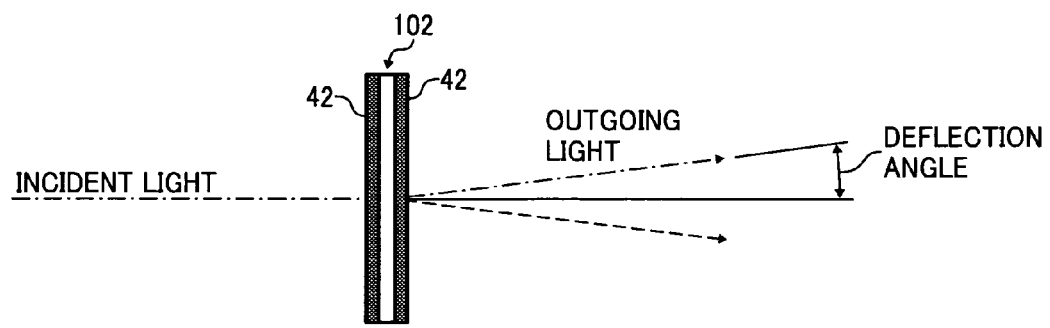
FIG. 6 shows a deflecting function of the liquid crystal deflecting element.

In FIG. 1, the numerals 101a and 101b are laser beam detectors, which detect the positions of the scanned laser beam in a sub-scanning direction (described in detail later). Hereinafter, the laser beam detectors 101a and 101b are collectively designated by the numeral 101 in some cases. A liquid crystal deflecting element 102, more specifically, liquid crystal deflecting regions 102a, 102b, 102c, and 102d shown in FIG. 4 are a scanning position correction unit which changes a scanning position of the laser beam in the sub-scanning direction. Each of the liquid crystal deflecting regions 102a, 102b, 102c, and 102d has an internal structure shown in FIG. 5. When a driving circuit 41 applies a rectangular or sinusoidal voltage to each of the liquid crystal deflecting regions 102a, 102b, 102c, and 102d, each of the liquid crystal deflecting regions 102a, 102b, 102c, and 102d deflects the incident laser beam in the sub-scanning direction as shown in FIG. 6 (in the case of nonoperating state, the liquid crystal deflecting region does not deflect the laser beam but transmits the laser beam). Thus, in the light scanning device of the first embodiment, the liquid crystal deflecting element 102 is arranged between the semiconductor lasers 1 and 1' and the optical deflector 7 such that the laser beams emitted from the semiconductor lasers 1, 1' are incident to the liquid crystal deflecting element 102. The voltage control is performed to the liquid crystal deflecting element 102, which controls the deflection state of the optical axis of the incident laser beam to correct the scanning position of the laser beam.

The scanning laser beam is corrected to a desired sub-scanning position by driving and controlling the liquid crystal deflecting element 102 based on the position detected by the laser beam detector 101.

The liquid crystal deflecting element 102 has four liquid crystal deflecting regions which are provided for the four laser beams to allow independent control of the four laser beams, so that the liquid crystal deflecting element 102 can independently control each of the laser beams. Accordingly, the liquid crystal deflecting element 102 is preferably arranged on the laser beam outgoing side of the half-mirror prism 4.

As shown in FIG. 4, the liquid crystal deflecting element 102 is divided into the liquid crystal deflecting regions 102a, 102b, 102c, and 102d corresponding to the four laser beams, and the liquid crystal deflecting element 102 independently changes the deflection angles of the four laser beams, which allows the scanning position of the laser beam to be changed. In the liquid crystal deflecting element 102 having the plural liquid crystal deflecting regions, the liquid crystal deflecting regions 102a, 102b, 102c, and 102d are sandwiched between two single laser transmission members 42.

Accordingly, the laser beams can independently be deflected and corrected, and a beam pitch of the two laser beams per color can be corrected in the sub-scanning direction.

The liquid crystal deflecting element 102 which is of the scanning position correction unit corrects the scanning position and deflects the laser beam incident to the polygon mirror based on the detection result of the laser beam detector 101. At this point, the light source 1 and 1' continuously emit the laser beams to detect the scanning position of the laser beam at time the laser beam detector 101 is scanned with the laser beam irrespective of the image formation (i.e., when the light source is modulated and driven in response to the image forming signal in the image forming region) or the non-image formation (i.e., when the light source is not modulated and driven with no image forming signal in the image forming region).

That is, the sub-scanning position of the laser beam is always detected irrespective of the image formation or the non-image formation. The liquid crystal deflecting element 102 which is of the scanning position correction unit is driven according to the detection result, and the optical axis of the laser beam is deflected (including the deflection in the sub-scanning direction) and corrected to a desired scanning position.

The scanning position changing operation is performed while desynchronized with output timing of the image forming signal (as with the laser beam detection, irrespective of the image formation or the non-image formation), and the scanning positions of the laser beams are sequentially corrected. As a result, the image deterioration is not generated even if the temperature is rapidly increased in the apparatus during the image formation.

The scanning position correction does not always have to be completed during the non-image formation. From the standpoint of image quality, preferably the scanning position correction is completed at the time the image forming signal is output. Additionally, from the standpoint of image quality, it is preferable that the scanning position correction is performed during the non-image formation until a time Th a scanning position changing amount becomes 50% of a target value in a time Te necessary to change the scanning position of the laser beam shown in FIG. 7 (a response time characteristic in an operation for changing the liquid crystal deflecting element 102 which is of the scanning position correction unit).

Figure 7:
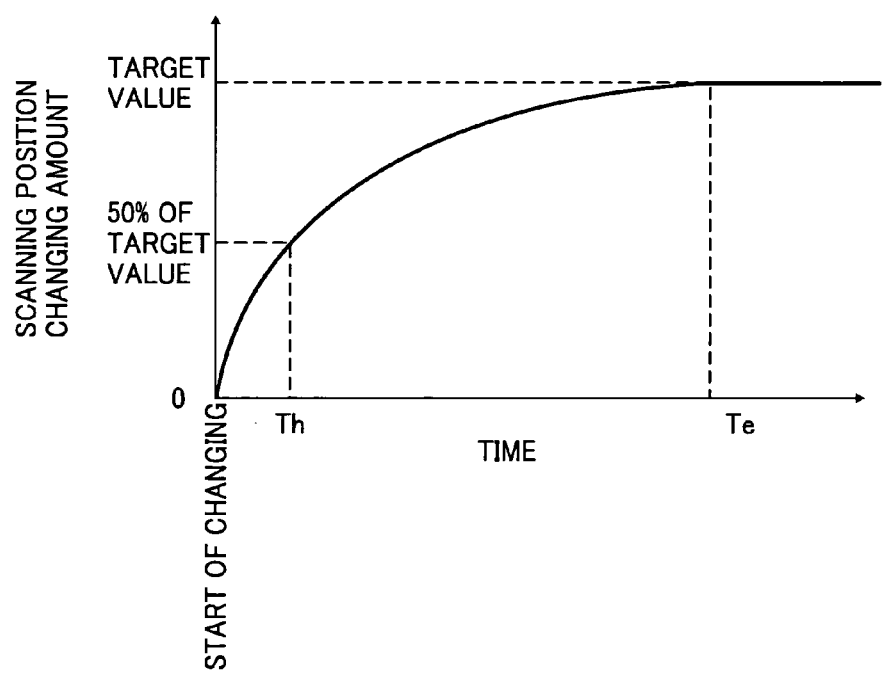
FIG. 7 shows a response time characteristic in a changing operation of the liquid crystal deflecting element.

That is, it is preferable that the image forming signal is output at a response time (Te—Th) during which the laser beam scanning position changing amount becomes not lower than 50% of the target value (a transient state in which a laser beam scanning position changing ratio is changed). As shown in FIG. 7, in the liquid crystal deflecting element 102, the scanning position changing amount is rapidly changed at the start of changing the scanning position of the laser beam, and the scanning position changing amount becomes gentle with time (transient phenomenon). Therefore, the influence of the rapid change in image can be suppressed to the minimum when the period until the time Th from the start of changing the scanning position of the laser beam exists in the time during the non-image formation. That is, even if the image forming signal is output, the change in image is hardly visually recognized as long as the laser beam scanning position is gently changed.

Because the correction amount (maximum value of a vertical axis in FIG. 7) performed by the scanning position correction unit ranges from one to two times pixel density in the sub-scanning direction, 50% of the maximum correction amount corresponds to 0.5 to one time the pixel density. For this reason, even if the image forming signal is output in the transient state of the change of the scanning position of the laser beam, the change in image becomes gentle and the change in image is hardly visually recognized.

There is such a restriction in characteristic that a deflection angle of the liquid crystal deflecting element cannot be increased when the response time Te is shorter than the non-image formation time. Furthermore, in this case, the non-image formation time becomes shortened in the high-speed image forming apparatus, and a long time is required to form the image in the image forming apparatus provided for continuous paper (roll paper). Therefore, the response time Te shorter than the non-image formation time is not suitable due to the large demerits from the practical viewpoint.

As described above, the scanning position correction is not always completed during the non-image formation. This is particularly suitable to the case in which the correction amount (maximum value of a vertical axis in FIG. 7) performed by the scanning position correction unit ranges from one to two times pixel density in the sub-scanning direction. In the case where the pixel density not lower than 600 dpi is ensured to obtain the high-quality image, the correction amount preferably ranges from 42 to 84 μm. In the case where the pixel density not lower than 1200 dpi is ensured, the correction amount preferably ranges from 21 to 42 μm.

When the correction amount performed by the scanning position correction unit is not lower than two times the pixel density in the sub-scanning direction, the correction amount (changing amount) is increased, so that the change in image is visually recognized during the image formation even if the response time goes by the time Th (color shading in the sub-scanning direction is easily visually recognized).

As described above, in the first embodiment of FIG. 1, the (multi-beam) light scanning is mutually performed to the photosensitive members 11a and 11b. For example, the light intensity of the light source is modulated with an image signal for the black image when the light scanning is performed to the photosensitive member 11a, and the light intensity of the light source is modulated with an image signal for the cyan image when the light scanning is performed to the photosensitive member 11b. Consequently, an electrostatic latent image of the black image can be written in the photosensitive member 11a and an electrostatic latent image of the cyan image can be written in the photosensitive member 11b.

Figure 8:
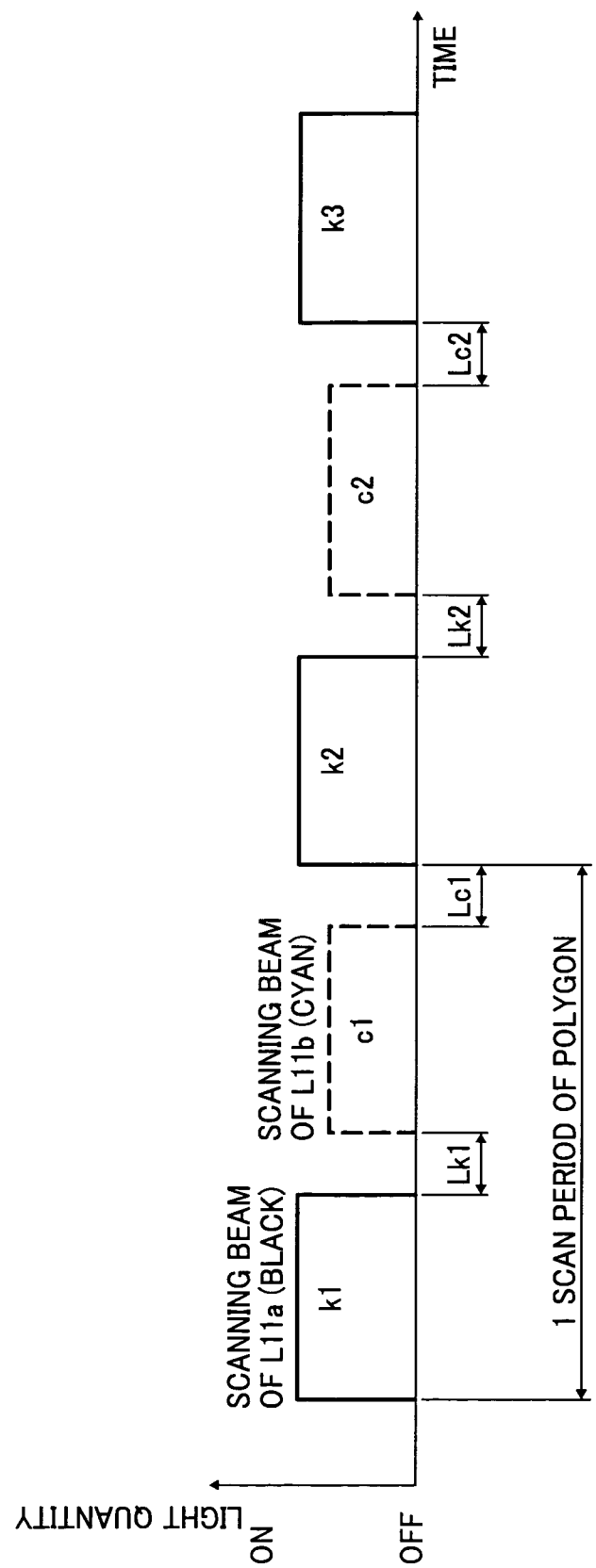
FIG. 8 is a timing chart when all the lights are turned on in writing a black image and a cyan image.

FIG. 8 shows a timing chart when all the lights are turned on in the effective scanning region in writing the black image and cyan image with the common light source (semiconductor lasers 1 and 1' of FIG. 1).

A solid line shows a portion corresponding to the write of the black image and a broken line shows a portion corresponding to the write of the cyan image. The main scanning timing at which the write of the black image and cyan image is started is determined by detecting the laser beam traveling toward the light scanning start position using a synchronous detection unit (not shown) provided out of the effective scanning region.

The synchronous detection unit is arranged on the scanning start side of FIG. 1, i.e., on the opposite side to the laser beam detector 101. The laser beam detector 101 may be commonly used as the synchronous detection unit by use of timing at which the laser beam passes through a point where light acceptance elements PD1 and PD2 (see FIG. 9A) of the laser beam detector 101 are parallel arranged perpendicular to the main scanning direction.

In the case where a relative difference in refractive index or reflectance of the optical elements exists in the optical paths from the light sources to the photosensitive members 11a and 11b, light quantities of the laser beams reaching the photosensitive members when emission intensity of the light source is set to the same level in the black image writing time and the cyan image writing time. Therefore, when the surfaces of the different photosensitive members are scanned, the emission intensities of the light sources are preferably caused to differ from each other as shown in FIG. 8. This is because the light quantities reaching the surfaces of the different photosensitive members can be equalized to each other.

The laser beam detector 101 shown in FIG. 1 is arranged at the position where the laser beam detector 101 is equalized to the laser beam scanning on the photosensitive member surface in optical characteristics (particularly, f-θ characteristic).

Figure 9A:
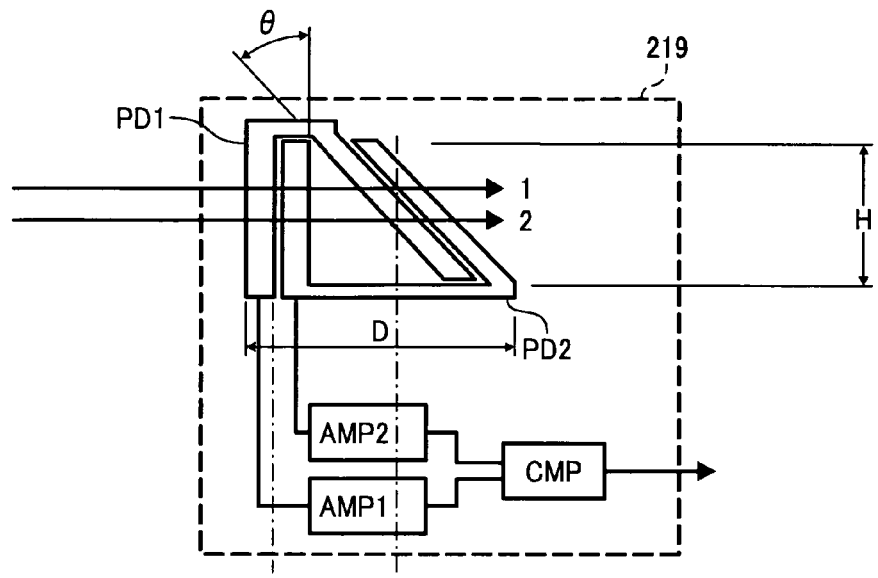
FIGS. 9A to 9C show a configuration and a function of a laser beam detector, where

The laser beam detector 101 is desirably located on the extended scanning line of the photosensitive member surface as shown in FIG. 1. Alternatively, for convenience of layout, the laser beam detector 101 may be located such that the laser beam scans the laser beam detector through the reflecting mirror. As shown in FIG. 9A, the laser beam detector 101 includes a comparator circuit which shapes signal waveforms output from the light acceptance elements PD1 and PD2. The laser beam detector 101 is integrally packaged in the form of a photo IC 219 (laser beam transmission member made of a resin) having the two light acceptance elements and the one comparator circuit.

The laser beam detector 101 is arranged outside the image region in the main scanning direction, and at least the light acceptance elements PD1 and PD2 (symbol D) are arranged within 10 mm from an end portion of the image region, namely the region where the laser beam is detected is arranged within 10 mm from the end portion of the image region.

When the light acceptance elements PD1 and PD2 are arranged outside the range within 10 mm, optical characteristics (curvature of field and magnification error) of the scanning imaging elements (such as scanning lens 8) are decreased to increase fluctuations in diameters of the laser beams incident to the light acceptance elements PD1 and PD2 and fluctuations in scanning times, which deteriorates the accuracy of detecting the laser beam detector 101.

In order to improve the detection accuracy, it is necessary that the range within 10 mm be decreased to 5 mm or less. A temperature fluctuation of a magnification error in the main scanning direction of the scanning imaging element arranged in the range within 10 mm from the end portion of the image region is set equal to or smaller than temperature fluctuations of other regions.

Because the position of the scanning beam in the sub-scanning direction is detected at scanning time intervals in the sub-scanning direction as described later, the fluctuation in magnification error (particularly deterioration with time caused by temperature fluctuation) in the main scanning direction directly influences the detection accuracy. For this reason, when the detection unit region is larger than the image region in the fluctuation in magnification error, the correlation between the image region and the detection unit region is eliminated (when the large fluctuation is generated in the detection unit region, there is a risk of recognizing the abnormal fluctuation even if the image region has the small fluctuation).

Because the laser beam detector 101 is arranged outside the image scanning region, in the conventional six deflection reflecting planes, there are problems in that the scanning angle of view is narrowed and optical characteristics are deteriorated.

On the other hand, the wide scanning angle of view can be ensured in the four deflection reflecting planes of the first embodiment, and the optical characteristics are less deteriorated. However, because it is not impossible that the deterioration is generated, desirably the laser beam detector 101 is arranged as close as possible to the image scanning region.

On the other hand, the laser beam detector 101 can be moved in the sub-scanning direction by an adjustment mechanism (not shown). That is, the laser beam detector 101 is fixed to a holder (not shown) in the adjustment mechanism, and the holder can be moved in the sub-scanning direction by a screw mechanism or the like.

In a light scanning device production (assembly) process, the laser beam detector 101 is moved and adjusted by the adjustment mechanism such that the scanning beams are located in the substantial center of a sub-scanning detectable region H of the light acceptance elements PD1 and PD2 in the laser beam detector 101.

In the case where the optical element including the reflecting mirror is arranged in front of the optical path of the laser beam detector 101, the adjustment can be performed by changing a reflection angle of the reflecting mirror. Alternatively, the adjustment can be performed by moving the scanning lens in the optical axis direction.

In the method in which the light acceptance element PD1 is moved and adjusted such that the scanning beam is located in the substantial center of the light acceptance elements PD1, the laser beam is actually scanned, and the light acceptance element PD1 is moved by the adjustment mechanism such that the output signal (Ts of FIG. 9B) of the laser beam detector 101 is set in a predetermined range.

The reason why the scanning beam is located in the substantial center of the light acceptance elements PD1 is that, because the scanning beam position is changed onto the upstream side or downstream side in the sub-scanning direction by the temperature change, the same detection regions are ensured as much as possible on the upstream side and downstream side in the sub-scanning direction.

The "substantial center" means that the scanning beam is hardly set in the exact center of the light acceptance elements PD1. Preferably, the adjustment is performed such that the scanning beam is located in the range of one-tenths of the sub-scanning detectable region H with respect to the center portion of the light acceptance element PD1.

Figure 9B:
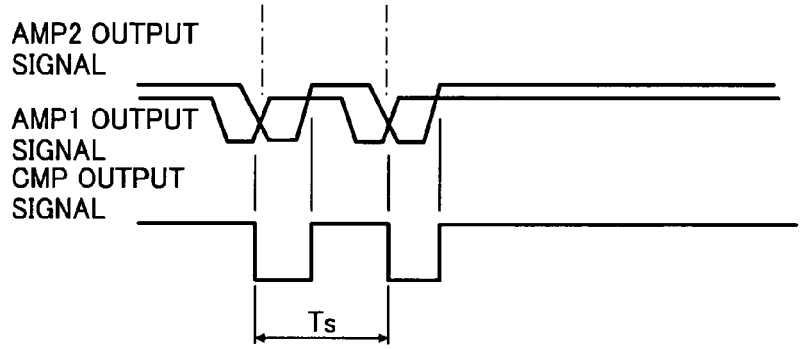
Figure 9C:
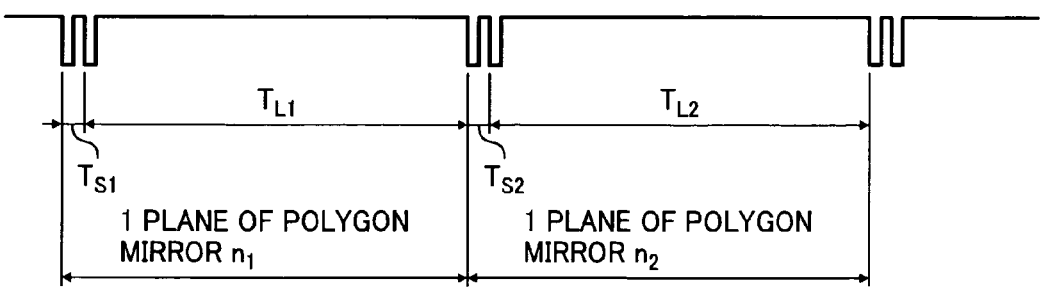

FIGS. 9A to 9C are diagrams for explaining a configuration of a photo IC 219 and a detection signal. FIG. 9A shows the configuration of the photo IC 219, and FIG. 9B shows an output waveform. The numeral PD1 designates a first-line light acceptance element PD1, the numeral PD2 designates a second-line light acceptance element PD2, the letter D designates a maximum element width (total width in the main scanning direction), the letter H designates an effective detection height in the sub-scanning direction, the letter θ designates an angle of an inclined side of the light acceptance element, the letter AMP designates an amplifier, and the letter CMP designates a comparator.

The first-line light acceptance element PD1 and the second-line light acceptance element PD2 are arranged adjacent to each other in the main scanning direction, and each of the light acceptance elements PD1 and PD2 is divided into two light acceptance regions formed not parallel with each other in the regions through which the laser beams pass. That is, the laser beam detector 101 includes the light acceptance element PDI and PD2 (light acceptance element pair). In each of the first-line light acceptance elements PD1 and PD2, the two light acceptance elements have the light acceptance regions (laser-beam passing surfaces), and the light acceptance regions are not parallel with each other to cause the scanning laser beams to pass therethrough. The light acceptance elements PD1 and PD2 are combined such that the light acceptance regions of the light acceptance elements PD1 and PD2 are parallel with each other.

The light acceptance regions are arranged adjacent to each other in the light acceptance elements PD1 and PD2, and adjacent edge portion of one of the light acceptance elements is linearly formed in parallel with the other light acceptance element. In each of the light acceptance element PD1 and PD2, the two light acceptance regions are arranged with the angle θ (0<θ<90°). Preferably, the angle θ ranges from 30° to 60°. FIG. 9A shows the angle θ of 45° which is of the most preferable example.

When the angle θ is lower than 30°, an absolute fluctuation amount of a time interval Ts is decreased for the scanning laser beam, which lowers detection sensitivity. When the angle θ is more than 60°, on the other hand, the effective detection height H in the sub-scanning direction is decreased for the total width D of the light acceptance surface in the main scanning direction. The total width D of the light acceptance surface is increased to ensure the necessary effective detection height H, which results in a problem in that the light acceptance surface invades into the image region. Additionally, it is necessary to widen the effective region of the scanning optical system, which results in a problem in that the scanning lens is lengthened.

In order to avoid the problems, it is preferable that the height H in the sub-scanning direction is set in the range of H=1 to 3 mm and the total width D of the light acceptance surface is set to 5 mm or less. Most preferably, the angle formed between the two light acceptance regions is set to 45° because the problems can be solved in the balanced manner.

One of the two light acceptance regions is formed perpendicular to the scanning direction of the laser beam. This is preferable to obtain the synchronous detection signal because the sensor output timing is not changed even if the laser beam is shifted in the sub-scanning direction.

The amplifiers AMP1 and AMP2 perform current-voltage conversion and voltage amplification to the light acceptance elements PD1 and PD2, respectively, and then, the comparator CMP performs voltage comparison. When an output signal level of the amplifier AMP2 is lower than an output signal level of the amplifier AMP1, the comparator CMP performs output.

Thus, because a cross point between the amplifiers AMP1 and AMP2 is detected, the detection accuracy is not influenced even if the light quantity of the laser beam is changed, whereby high-accuracy detection can be performed. A distance between the first-line light acceptance element PD1 and the second-line light acceptance element PD2 is set smaller than a spot size of the passing laser beam.

FIG. 9B is a timing chart showing the output signal of the laser beam detector when the laser beam LI passes through the light acceptance element PD1 and PD2. The passage of the laser beam allows two pulses to be output, and the time interval Ts from the fall to the fall of the two pluses depends on the sub-scanning position of the laser beam to be scanned.

For example, as shown in FIG. 9A, when the laser beam (1) is changed to the position (2) and a time interval difference is indicated by ΔTs, an amount δ of laser beam sub-scanning position change is determined by the following equation (1):

$$\delta = (v \times \Delta Ts)/\tan\theta \qquad (1)$$

where v is a speed of the laser beam to be scanned.

Assume that, like the multi-beam light source unit configured such that one light source unit has plural laser beams, plural laser beams are simultaneously scanned in one polygon mirror surface. In this case, only when the laser beam detector 101 is scanned, the scanning is performed with any one of the laser beams and other laser beams are turned off or dimmed to an extent in which the laser beam is not detected.

This is because a wrong detection value is output when the light acceptance portion of the laser beam detector 101 is scanned with the plural laser beams.

In the actual polygon mirror, an error (variation) is generated in the time interval because surface inclination and a jitter component exist. In the first embodiment, the following countermeasure is performed to prevent the decrease in detection accuracy caused by the error component.

FIG. 9C shows a part of a CMP output signal obtained from the continuously-rotating polygon mirror. The time interval includes a time interval Ts (PD1 to PD2) during which the laser beam detector is scanned and a time interval $T_L$ (PD2 to PD1 of the next polygon mirror surface).

A ratio of Ts and $T_L$ is determined by the scanning width and the number of revolutions of the polygon mirror (scanning speed), the ratio of Ts:$T_L$ ranges from 1:200 to 1:400.

FIG. 10 is a graph schematically showing the time interval. In order to reduce the influence of the polygon mirror on the variation in time interval, pieces of measurement data of the time interval are sequentially stored in a storage unit, the pieces of measurement data are divided into two time interval groups, and it is determined that an average of the shorter time intervals is the sub-scanning position of the laser beam.

An exemplary method for distinguishing the shorter time interval from the other is as follows. Because there is the large difference between Ts and $T_L$, an intermediate time interval between the Ts and $T_L$ is computed, and the shorter time interval is distinguished (filtered) from the other based on the computation result.

Because the following problem exists in the case where only a specific surface is measured, it is preferable that the measurement data is obtained from all the circumferential surfaces of the polygon mirror in the embodiment. When one surface differs largely from other surfaces in the surface inclination, flaw, or flatness (does not influence the image), the laser beam detector is possibly influenced to deteriorate the accuracy of detecting the sub-scanning position.

Actually in order to average the time interval Ts, the number of samples ranges preferably from about 100 to about 500. The number of samples is preferably even times the number of polygon mirror surfaces.

That is, the number of samples is two (Ts and $T_L$) for one polygon mirror surface because the surface inclination and jitter have a period of one revolution (whole circumferential surface) of the polygon mirror.

Then, a second embodiment of the invention will be described. The second embodiment is a scanning position changing unit or another liquid crystal deflecting element 102 which is of the scanning position changing unit. In the second embodiment, the same component is designated by the same numeral, the descriptions of the configuration and function are neglected unless required, and only the main part is described (the same holds true in the subsequent embodiments).

Figure 11A:
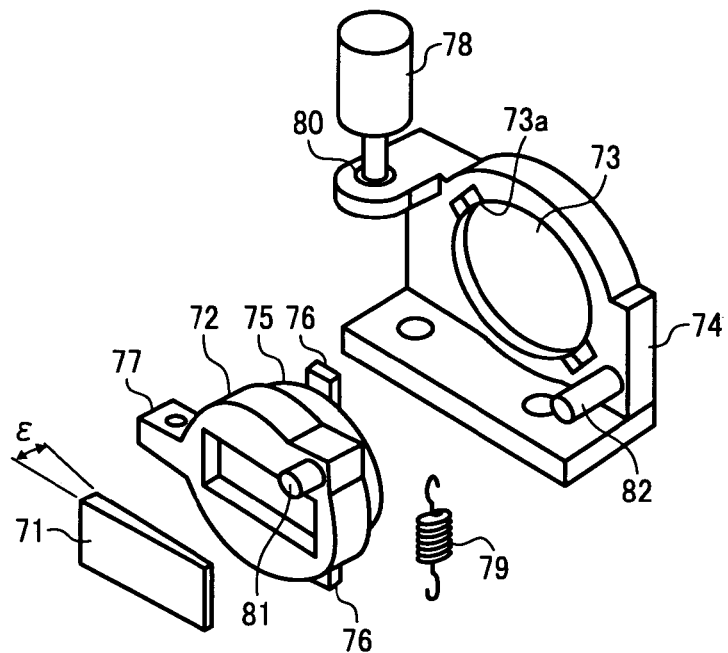
FIGS. 11A and 11B each show a scanning position changing unit according to a second embodiment, where
Figure 11B:
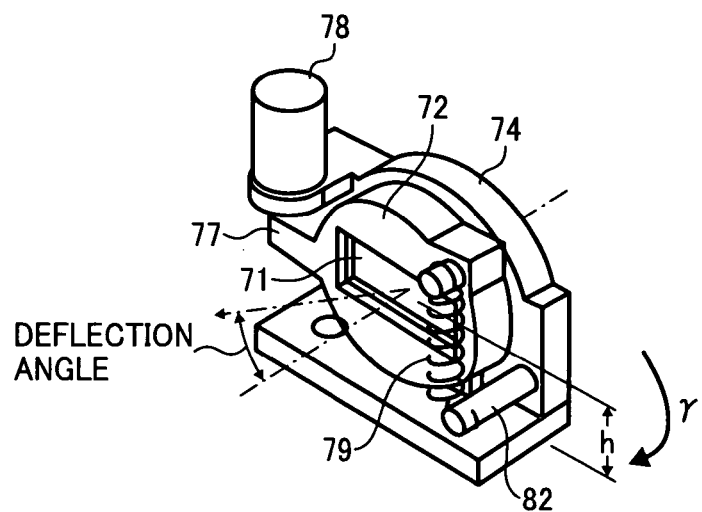

FIG. 11 shows a configuration of a nonparallel plate assembly which is of the scanning position changing unit according to the second embodiment. A nonparallel plate 71 is fixed in a central frame of a holder member 72. A pair of collar portions 76 of the holder member 72 is inserted into a support member 74, in which a backing portion 73 (substantially cylindrical surface of an inner circumferential portion) is formed, while fitted in notches 73a. When the collar portions 76 of the holder member 72 are returned to the horizontal position, the collar portions 76 are latched to the backside of the backing portion 73, and the holder member 72 is rotatably retained in the backing portion 73 while being in close contact with the support member 74.

The support member 74 is screwed to an optical housing (not shown) based on a bottom surface, and a height h is set such that a rotational center of the backing portion 73 is coincident with a rotational center of an outgoing optical axis of the light source unit, which allows the optical axis of the outgoing beam to be deflected by the rotation.

A lever 77 is formed at one end of the holder member 72, and a feed screw engages the lever 77. The feed screw is formed at a front end of a shaft of a stepping motor 78, and the shaft of the stepping motor 78 is inserted into a through hole 80 formed in the support member 74. The feed screw is vertically displaced by the rotation of the stepping motor 78, and the nonparallel plate 71 is rotated according to the vertical displacement of the feed screw.

In order to eliminate backlash, a tensile force is applied between a pin 81 of the holder member 72 and a pin 82 of the support member 74 to bias the holder member 72 by a spring 79.

Assuming that γ is a rotational angle, ε is a vertical angle of the nonparallel plate 71, fc is a focal distance of a coupling lens in the light source device, and ζ is a sub-scanning magnification of the whole optical system, a sub-scanning position changing amount Δy on the photosensitive member surface is given by the following equation:

$$\Delta y = \zeta \cdot fc \cdot (n-1) \epsilon \cdot \sin \quad (2)$$

where n is a refractive index of the nonparallel plate. Preferably, the vertical angle ε of the nonparallel plate 71 ranges from 1 to 5°. When the vertical angle ε of the nonparallel plate 71 is lower than 1°, it is necessary that the stepping motor be rotated for a long time because reaction is slow to the rotational angle γ, which lengthens the change time. When the vertical angle ε of the nonparallel plate 71 is more than 5°, there is a disadvantage of lowering resolution of the changing amount because reaction becomes excessively sensitive to the rotational angle γ.

A response characteristic between the change of the laser beam scanning position and the change of the rotational angle of the nonparallel plate 71 differs from a response characteristic between the change of the laser beam scanning position and the change of the deflection state of the liquid crystal deflecting element 102 (see FIG. 7). However, the response characteristics are similar to each other in that the rapid change is exerted at the start of the change, namely, in the characteristic (sine function) in which the changing amount becomes gentle with time.

Preferably, a rotational sliding surface is made of polyacetal, polyimide resin, or rubricating nickel plating which has a low friction coefficient and a good wear-resistant property, and a nonparallel plate 71 is made of glass having the surface flatness not lower than flatness 100 mR.

In the case of the use of a resin material which is easily produced at low cost when the flatness is not more than 100 mR, it is preferable to add a process of adjusting the nonparallel plate 71 in the optical axis direction. This is because an optical problem (fluctuation in image surface position) occurs when the flatness is not more than 100 mR. The optical problem can be solved in conjunction with the adjustment process.

As with the liquid crystal deflecting element 102, when the liquid crystal deflecting element is arranged while divided into four liquid crystal deflecting regions, each of the laser beams incident to the nonparallel plate 71 can independently be deflected and finely corrected. Therefore, in the case where the number of driving motors or power consumption is decreased, or in the case where the downsizing is required, the two laser beams of the upper stage (L11) out of the laser beams divided in the sub-scanning direction by the half-mirror prism 4 may be incident to the nonparallel plate 71. In the multi-chip semiconductor laser in which the distance between the two laser beams is not changed to an extent in which the correction is not required, two single-chip semiconductor lasers are used to perform optical composition.

At this point, at least each two of the laser beams outgoing from the upper stage (L11) and lower stage (L12) are incident to the nonparallel plate 71, and the deflection angles of the nonparallel plates can be caused to differ from each other.

Thus, in the light scanning device of the second embodiment, the nonparallel plate 71 is arranged between the semiconductor lasers 1 and 1' and the optical deflector 7 such that the laser beams emitted from the semiconductor lasers 1 and 1' are incident to the nonparallel plate 71. The rotation of the nonparallel plate 71 is controlled, whereby the deflection state in the optical axis of the incident laser beam is controlled to correct the scanning position of the laser beam.

Figure 12:
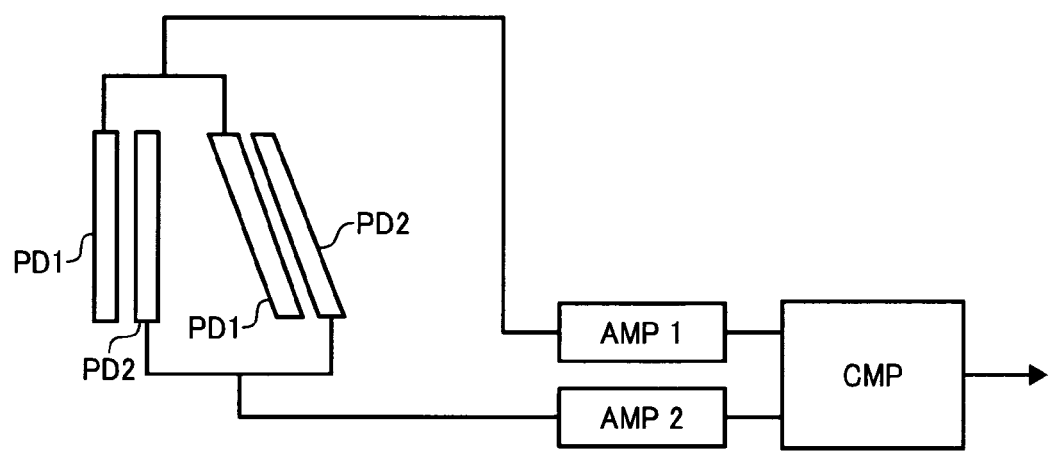
FIG. 12 shows a configuration of a laser beam detector according to a third embodiment.

FIG. 12 shows a laser beam detector according to a third embodiment of the invention. The laser beam detector of the third embodiment is a modification of the first embodiment. In FIG. 12, each of the first-line light acceptance element PD1 and second-line light acceptance element PD2 is divided into two elements to form two light acceptance regions.

The light acceptance regions are electrically connected to each other to enable the laser beam to be detected as if to be one light acceptance element. Accordingly, signal processing is exactly the same as that shown in FIG. 9B.

Figure 13:
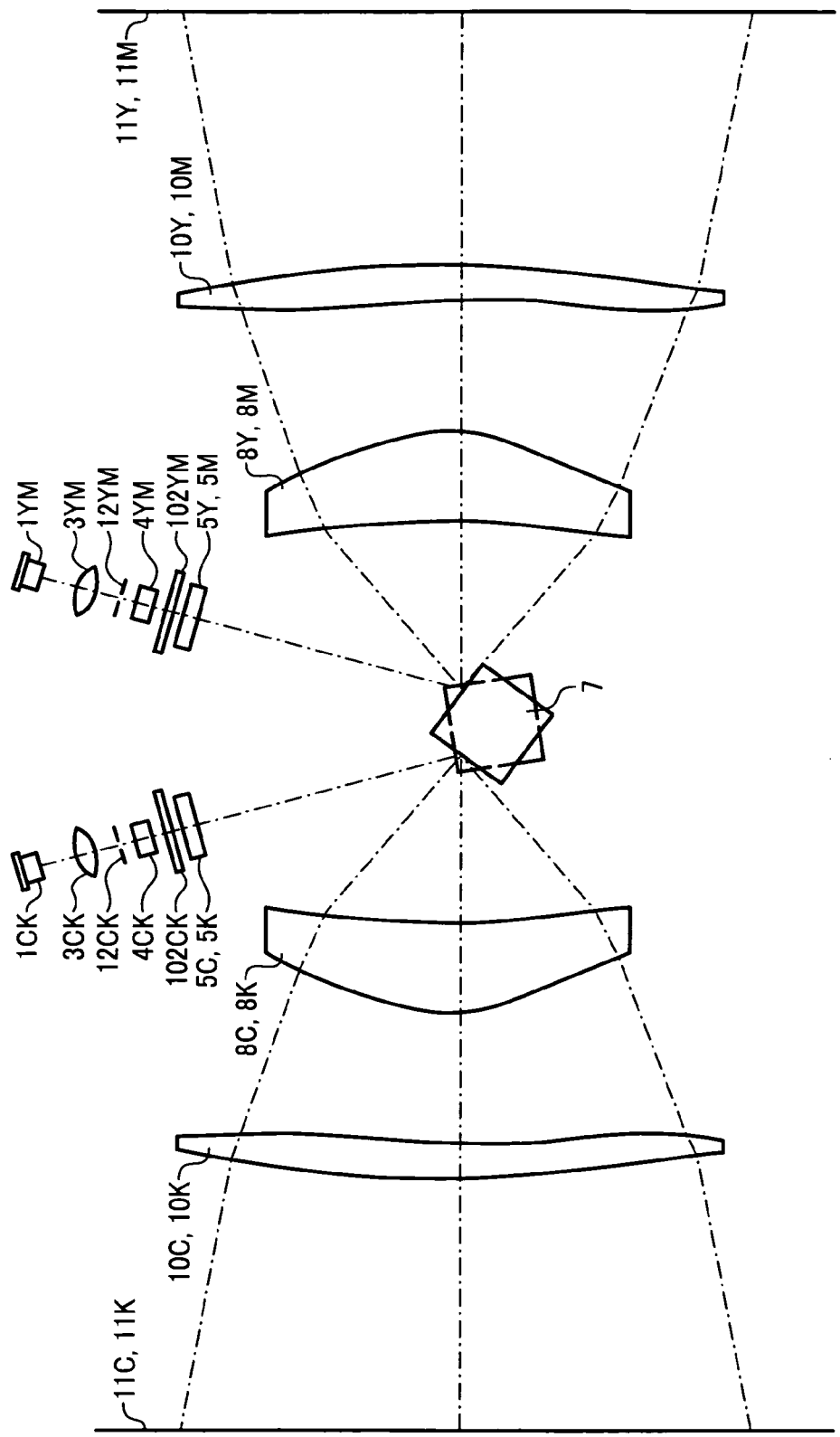
FIG. 13 is a schematic plan view showing a tandem-type light scanning device in which the light scanning devices are arranged at positions facing each other while optical deflector is interposed therebetween according to a fourth embodiment.

FIG. 13 is a schematic plan view showing a tandem-type light scanning device according to a fourth embodiment of the invention. In the tandem-type light scanning device of the fourth embodiment ready for four colors, the light scanning devices shown in FIG. 1 are arranged at positions facing each other while optical deflector is interposed therebetween. FIG. 13 shows the optical system portion of the light scanning device when viewed from the sub-scanning direction, i.e., the rotational axis direction of the optical deflector 7. For the purpose of simple illustration, in FIG. 13, the optical path bending mirror located on the optical path from the optical deflector 7 to the light scanning position is neglected such that the optical path becomes a straight line.

The light scanning device is an example in which each of the four light scanning positions is scanned with one laser beam. Photosensitive members 11Y, 11M, 11C, and 11K are arranged at light scanning positions respectively, and electrostatic latent images formed in the four photosensitive members are individually visualized with magenta, yellow, cyan, and black toners to form a color image.

The numerals 1YM and 1CK designate semiconductor lasers which are of the light source. Each of the semiconductor lasers 1YM and 1CK emits one laser beam. In the semiconductor laser 1YM, the intensity is alternately modulated by an image forming signal corresponding to the yellow image and an image forming signal corresponding to the magenta image.

In the semiconductor laser 1CK, the intensity is alternately modulated by an image forming signal corresponding to the cyan image and an image forming signal corresponding to the black image.

The laser beam emitted from the semiconductor laser 1YM is formed in a parallel light flux by a coupling lens 3YM, and passes through an aperture 12YM to be shaped. Then, the laser beam is incident to a half-mirror prism 4YM and split into two laser beams in the sub-scanning direction.

Figure 2:
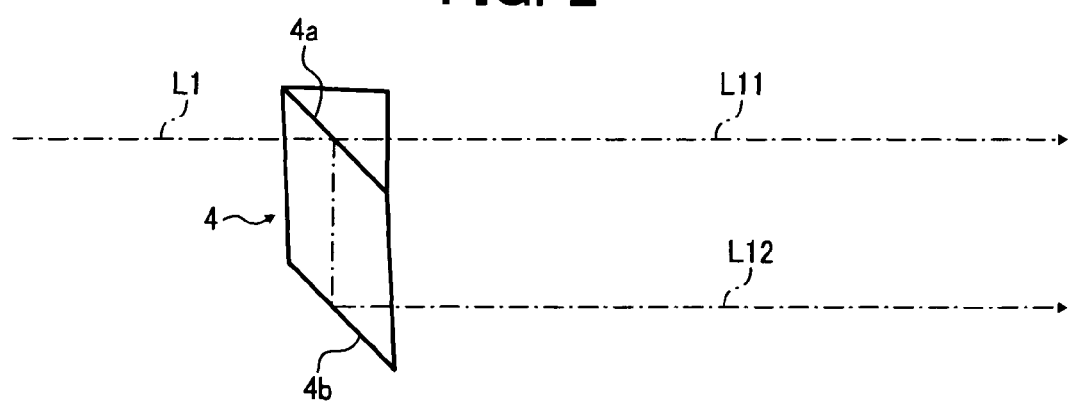
FIG. 2 shows a splitting function of a half-mirror prism.

The half-mirror prism 4YM is similar to the half-mirror prism 4 of FIG. 2. One of the split laser beams is used to write the yellow image, and the other is used to write the magenta image.

The two laser beams split in the sub-scanning direction are controlled such that the sub-scanning positions are corrected by a liquid crystal deflecting element 102YM if needed. The laser beams are collected in the sub-scanning direction by cylindrical lens 5Y and 5M (arranged so as to overlap each other in the sub-scanning direction) provided in the sub-scanning direction respectively, and are incident to the optical deflector 7.

The optical deflector 7 of the fourth embodiment is similar to that of FIGS. 1 and 3. The two polygon mirrors each of which has four deflection reflecting planes are integrally laminated in the rotational axis direction, and the deflection reflecting planes of the polygon mirrors are shifted from each other in the rotational direction. The line images lengthened in the main scanning direction by the cylindrical lens 5Y and 5M are imaged near the deflection reflecting plane position of each polygon.

The laser beams deflected by the optical deflector 7 are transmitted through first scanning lenses 8Y and 8M and second scanning lenses 10Y and 10M, respectively, light spots are formed at light scanning positions 11Y and 11M by lens action, and the light scanning position is scanned with the laser beam.

Similarly, the laser beam emitted from the semiconductor laser 1CK is formed in the parallel light flux by a coupling lens 3CK, and passes through an aperture 12CK to be shaped. Then, the laser beam is incident to a half-mirror prism 4CK and split into two laser beams in the sub-scanning direction.

The half-mirror prism 4CK is similar to the half-mirror prism 4YM. One of the split laser beams is used to write the cyan image, and the other is used to write the black image.

The two laser beams split in the sub-scanning direction are corrected in the sub-scanning direction by cylindrical lens 5C and 5K (arranged so as to overlap each other in the sub-scanning direction) provided in the sub-scanning direction respectively, and are incident to the optical deflector 7 and deflected. Then, the laser beams are transmitted through first scanning lenses 8C and 8K and second scanning lenses 10C and 10K. respectively, the light spots are formed at light scanning positions 11C and 11K by the lens action, and the light scanning position is scanned with the laser beam.

Figure 14:
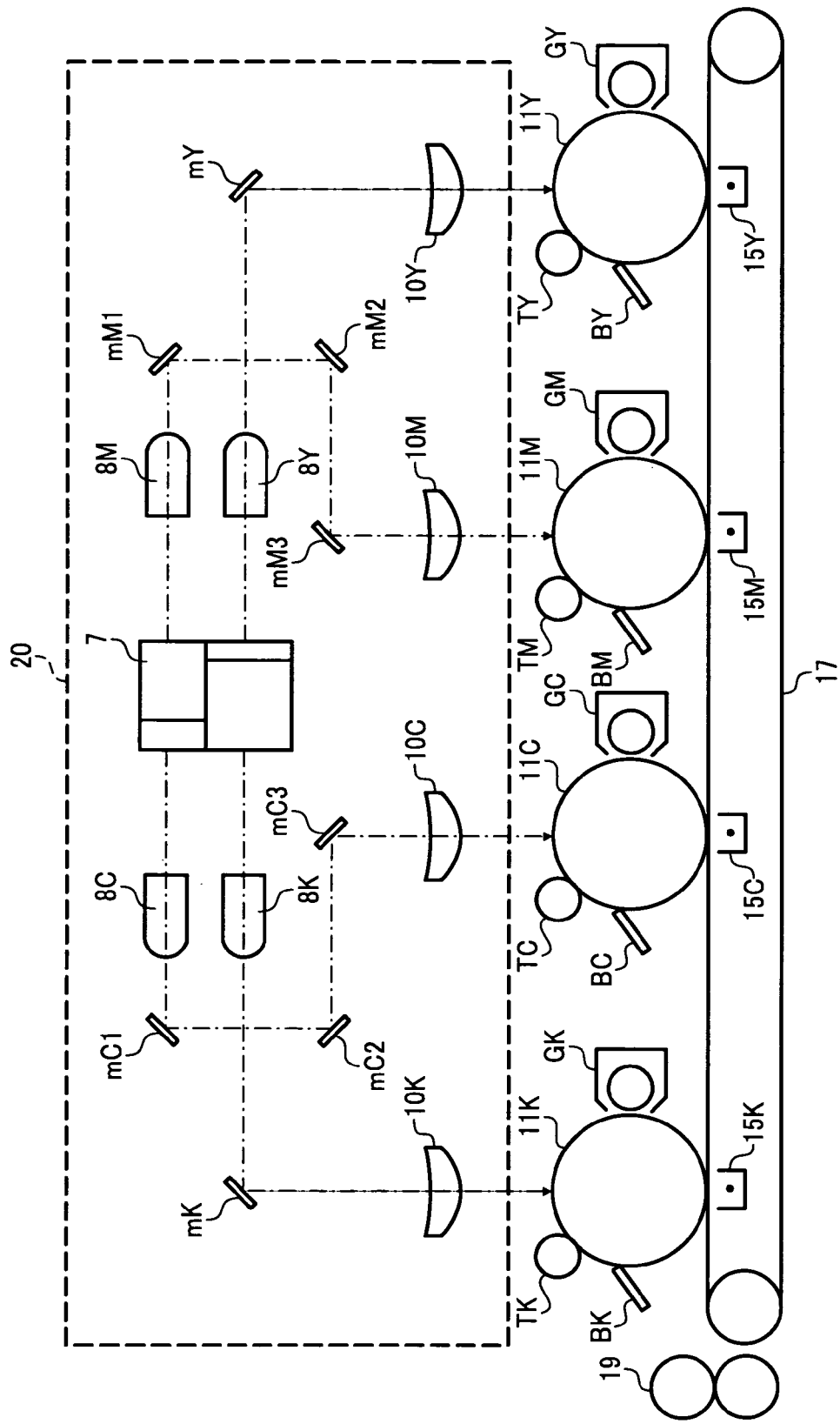
FIG. 14 shows a schematic configuration of a color image forming apparatus according to a fifth embodiment.

A color image forming apparatus according to a fifth embodiment of the invention will be described with reference to FIG. 14. In FIG. 14, the light scanning device shown by a portion 20 has four-color (yellow, magenta, cyan, and black) scanning imaging optical system for a color image forming apparatus, and the laser beams corresponding to the four colors are collected to the photosensitive member, respectively.

One of the laser beams deflected by the upper-stage polygon mirror of the optical deflector 7 is guided to the photosensitive member 11M constituting a substance of the light scanning position through the optical path bent by optical-path folding mirrors mM1, mM2, and mM3. The other laser beam is guided to the photosensitive member 11C constituting a substance of the light scanning position through the optical path bent by optical-path folding mirrors mC1, mC2, and mC3.

One of the laser beams deflected by the lower-stage polygon mirror of the optical deflector 7 is guided to the photosensitive member 11Y constituting a substance of the light scanning position through the optical path bent by an optical-path folding mirror mY. The other laser beam is guided to the photosensitive member 11K constituting a substance of the light scanning position through the optical path bent by an optical-path folding mirrors mK.

Accordingly, each of the laser beams emitted from the two semiconductor lasers 1YM and 1CK is split into two laser beams by each of the half-mirror prisms 4YM and 4CK, and the four photosensitive members 11Y, 11M, 11C, and 11K are scanned by the four laser beams respectively.

The photosensitive member 11Y and 11M are alternately scanned in association with the rotation of the optical deflector 7 with laser beams obtained by splitting the laser beam emitted from the semiconductor laser 1YM. The photosensitive members 11C and 11K are alternately scanned in association with the rotation of the optical deflector 7 with laser beams obtained by splitting the laser beams emitted from the semiconductor lasers 1YM and 1CK.

The photosensitive members 11Y to 11K are rotated clockwise at a uniform speed, and the photosensitive members 11Y to 11K are uniformly charged by charging rollers TY, TM, TC, and TK which constitute a charging unit. Then, the photosensitive members 11Y to 11K are scanned to write the yellow, magenta, cyan, and black images by the laser beams, thereby to form the corresponding electrostatic latent images (negative latent images).

The electrostatic latent images are reversely developed by development devices GY, GM, GC, and GK respectively, and a yellow toner image, a magenta toner image, a cyan toner image, and a black toner image are formed on the photosensitive member 11Y, 1M, 11C, and 11K.

The yellow, magenta, cyan, and black toner images are transferred onto a transfer sheet (not shown). That is, the transfer sheet is conveyed by a conveyance belt 17, the yellow toner image is transferred to the transfer sheet from the photosensitive member 11Y by a transfer device 15Y, and the magenta toner image, the cyan toner image, and the black toner image are sequentially transferred to the transfer sheet from the photosensitive members 11M, 11C, and 11K by the transfer devices 15M, 15C, and 15K.

Thus, the yellow toner image, the magenta toner image, the cyan toner image, and the black toner image are superposed on the transfer sheet to synthetically form a color image. The color image is fixed onto the transfer sheet by a fixing device 19.

Although the preferred embodiments of the present invention have been mentioned, it should be noted that the present invention is not limited to these embodiments, various modifications and changes can be made to the embodiments.

What is claimed is:
1. A light scanning device comprising:
a light source which emits a laser beam modulated and driven in response to an image forming signal;
a deflection scanning unit which scans the laser beam emitted from the light source in a main scanning direction;

a scanning position correction unit configured to change a scanting position of the laser beam emitted from the light source in a sub-scanning direction; and a laser beam detector including a light acceptance element and detecting a sub-scanning position in the sub-scanning direction of the laser beam configured to pass over the light acceptance element, wherein the laser beam is emitted by the light source at a timing such that the laser beam is scanned upon the laser beam detector, such that the laser beam detector always detects the sub-scanning position even at the time when the image is not formed irrespective of the presence or absence of the image forming signal, wherein a changing operation of the scanning position in the sub-scanning direction by the scanning position correction unit is performed asynchronously with output timing of the image forming signal in accordance with a detection result of the laser beam detector and performed at the time when forming the image, at which the light source is modulated and driven in accordance with the image forming signal, wherein the scanning position correction unit is a liquid crystal deflecting element disposed between the light source and the deflection scanning unit, the liquid crystal deflecting element being configured to change an optical axis of the incident laser beam and correct the scanning position by receiving an applied voltage and wherein the changing operation of the scanning position is performed at a time when forming the image in response to the image forming signal where the liquid crystal deflecting element is in a state that provides an amount of correction of 50% for the scanning position.

2. The light scanning device according to claim 1, wherein the scanning position correction unit corrects the scanning position of the laser beam in a range of one to two times pixel density in the sub-scanning direction.

3. The light scanning device according to claim 1, wherein the laser beam detector has two light acceptance elements, and wherein each light acceptance element has laser-beam passing surfaces which are not parallel to each other, and wherein the light acceptance elements are combined to have laser-beam passing surfaces that are parallel to each other.

4. The light scanning device according to claim 1, wherein the light acceptance element is located in a substantial center in the sub-scanning direction.

5. A color image forming apparatus, wherein the light scanning device according to claim 1 is applied, a latent image is formed in an image bearing member, and the latent image is visualized to obtain a recording image.

6. A light scanning device comprising:
a light source which emits a laser beam in response to an image forming signal;
a deflection scanning unit which scans the laser beam emitted from the light source in a main scanning direction; and
a scanning position correction unit which changes a scanning position of the laser beam emitted from the light source; and
a laser beam detector including a light acceptance element and detecting a sub-scanning position in a sub-scanning direction of the laser beam configured to pass over the light acceptance element, wherein the laser beam is emitted by the light source at a timing such that the laser beam is scanned upon the laser beam detector, such that the laser beam detector always detects the laser beam irrespective of the presence or absence of the image forming signal, wherein a changing operation of the scanning position in a sub-scanning direction by the scanning position correction unit is performed asynchronously with output timing of the image forming signal in accordance with a detection result of the laser beam detector, wherein the image forming signal is output at a time when a degree of change of the scanning position is in a predetermined range in a transient state of the scanning position change performed by the scanning position correction unit, wherein the scanning position correction unit is a liquid crystal deflecting element disposed between the light source and the deflection scanning unit, the liquid crystal deflecting element being configured to change an optical axis of the incident laser beam and correct the scanning position by receiving an applied voltage, and wherein the image forming signal is output while the liquid crystal deflecting element is in a state that provides an amount of correction of 50% for the scanning position.

7. The light scanning device according to claim 6, wherein the scanning position correction unit corrects the scanning position of the laser beam in a range of one to two times pixel density in the sub-scanning direction.

8. The light scanning device according to claim 6, wherein the laser beam detector has two light acceptance elements, and wherein each light acceptance element has laser-beam passing surfaces which are not parallel to each other, and wherein the light acceptance elements are combined to have laser-beam passing surfaces that are parallel to each other.

9. The light scanning device according to claim 6, wherein the light acceptance element is located in a substantial center in the sub-scanning direction.

10. A color image forming apparatus, wherein the light scanning device according to claim 6 is applied, a latent image is formed in an image bearing member, and the latent image is visualized to obtain a recording image.

* * * * *